United States Patent
Kwon et al.

(10) Patent No.: US 8,465,865 B2
(45) Date of Patent: Jun. 18, 2013

(54) CABLE-TYPE SECONDARY BATTERY HAVING METAL-COATED POLYMER CURRENT COLLECTOR

(75) Inventors: Yo-Han Kwon, Daejeon (KR); Je-Young Kim, Daejeon (KR); Ki-Tae Kim, Daejeon (KR); Heon-Cheol Shin, Busan (KR); Hyung-Man Cho, Busan (KR); Hye-Ran Jung, Busan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/399,265

(22) Filed: Feb. 17, 2012

(65) Prior Publication Data

US 2012/0148902 A1  Jun. 14, 2012

Related U.S. Application Data

(63) Continuation of application No. PCT/KR2011/003678, filed on May 18, 2011.

(30) Foreign Application Priority Data

May 20, 2010 (KR) .................. 10-2010-0047529

(51) Int. Cl.
*H01M 10/00* (2006.01)
(52) U.S. Cl.
USPC ........................................................ 429/122
(58) Field of Classification Search
None
See application file for complete search history.

(56) References Cited

U.S. PATENT DOCUMENTS

| | | | |
|---|---|---|---|
| 6,379,835 B1 * | 4/2002 | Kucherovsky et al. | 429/118 |
| 2004/0048156 A1 * | 3/2004 | Thackeray et al. | 429/219 |
| 2005/0084760 A1 | 4/2005 | Hwang et al. | |

FOREIGN PATENT DOCUMENTS

| | | |
|---|---|---|
| JP | 4-169066 A | 6/1992 |
| JP | 8-88019 A | 4/1996 |
| JP | 9-7629 A | 1/1997 |
| KR | 10-2005-0030438 A | 3/2005 |
| KR | 10-2005-0099903 A | 10/2005 |
| KR | 10-0742739 B1 | 7/2007 |
| KR | 10-2008-0067371 A | 7/2008 |
| WO | WO2005/098994 | * 10/2005 |

* cited by examiner

*Primary Examiner* — Patrick Ryan
*Assistant Examiner* — Wyatt McConnell
(74) *Attorney, Agent, or Firm* — Birch, Stewart, Kolasch & Birch, LLP

(57) ABSTRACT

A cable-type secondary battery is disclosed. The cable-type secondary battery includes electrodes, each of which includes a current collector having a horizontal cross section of a predetermined shape and an active material layer formed on the surface of the current collector. The electrodes extend in the lengthwise direction and are arranged in parallel. The current collector includes a polymer core and a metal coating layer formed on the surface of the polymer core. The use of the metal-coated polymer current collectors having high flexibility and conductivity makes the secondary battery highly flexible while maintaining the performance of the secondary battery. In addition, the cable-type secondary battery can be reduced in weight.

19 Claims, 5 Drawing Sheets

CABLE-TYPE SECONDARY BATTERY HAVING METAL-COATED POLYMER CURRENT COLLECTOR

CROSS-REFERENCE TO RELATED APPLICATION

This application is a continuation of International Application No. PCT/KR2011/003678 filed on May 18, 2011, which claims priority under 35 USC 119(a) to Korean Patent Application No. 10-2010-0047529 filed in the Republic of Korea on May 20, 2010, the entire contents of which are incorporated herein by reference.

TECHNICAL FIELD

The present disclosure relates to a cable-type secondary battery having a metal-coated polymer current collector.

BACKGROUND ART

Secondary batteries are devices capable of storing energy in chemical form and of converting into electrical energy to generate electricity when needed. Secondary batteries are also called "rechargeable batteries," which means that they are capable of repeated charge and discharge. Lead-acid batteries, nickel cadmium (NiCd) batteries, nickel metal hydride (NiMH) batteries, lithium ion batteries and lithium ion polymer batteries are frequently used as secondary batteries. Secondary batteries offer economic and environmental advantages over primary batteries that are disposed of after energy stored therein has been exhausted.

Secondary batteries are currently used in applications where low power is needed, for example, devices for assisting in the start-up of car engines, portable devices, instruments and uninterrupted power supply systems. Recent developments in wireless communication technologies have led to the popularization of portable devices and have brought about a tendency to connect many kinds of existing devices to wireless networks. As a result, demand for secondary batteries is dramatically increasing. Secondary batteries are also used in environmentally friendly next-generation vehicles such as hybrid vehicles and electric vehicles to reduce the costs and weight and to increase the service life of the vehicles.

Generally, most secondary batteries have a cylindrical, prismatic or pouch type shape depending on the fabrication process thereof. That is, a secondary battery is typically fabricated by inserting an electrode assembly composed of an anode, a cathode and a separator into a cylindrical or prismatic metal can or a pouch-type case made of an aluminum laminate sheet, and injecting an electrolyte into the electrode assembly. Accordingly, the cylindrical, prismatic or pouch-type secondary battery requires a certain space for assembly, which is an obstacle to the development of various types of portable devices. Thus, there is a need for a novel type of secondary battery that is easily adaptable in shape.

In response to this need, linear batteries whose ratio of length to cross-sectional diameter is very high have been proposed. Korean Patent Registration No. 742739 discloses a flexible linear battery in the form of a thread that can be readily woven. The linear battery uses metal or conductive polymer current collectors. However, the metal current collectors are not satisfactory in terms of flexibility and their weight is difficult to reduce. The conductivity of the conductive polymer current collectors is disadvantageously lower than that of metal current collectors.

DISCLOSURE

Technical Problem

The present disclosure is designed to solve the problems of the prior art, and therefore it is an object of the present disclosure to provide a current collector whose shape is easy to change that can maintain the stability and performance of a secondary battery, thus being suitable for use in a cable-type secondary battery.

Technical Solution

According to the present disclosure, there is provided a cable-type secondary battery which includes electrodes, each of which includes a current collector having a horizontal cross section of a predetermined shape and an active material layer formed on the surface of the current collector, extending in lengthwise direction and arranged in parallel, wherein the current collector includes a polymer core and a metal coating layer formed on the surface of the polymer core.

Any polymer that is readily bendable by shaping may be used as a material for the polymer core, and examples thereof include polyacetylene, polyaniline, polypyrrole, polythiophene, poly(sulfur nitride), polyethylene (PE), polypropylene (PP), polyvinyl chloride (PVC), polyvinyl alcohol (PVA), polyacrylate and polytetrafluoroethylene (PTFE).

The metal coating layer may be formed of at least one metal selected from silver, palladium, nickel and copper.

The active materials may be in the form of particles of at least one anode active material selected from the group consisting of natural graphite, artificial graphite, carbonaceous materials, LTO, silicon (Si) and tin (Sn), and may be in the form of particles of at least one cathode active material selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$, $x+y+z \leq 1$).

Advantageous Effects

The cable-type secondary battery of the present disclosure includes metal-coated polymer current collectors having high flexibility and conductivity to achieve high flexibility while maintaining battery performance. In addition, the cable-type secondary battery of the present disclosure can be reduced in weight.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

Figure 1:
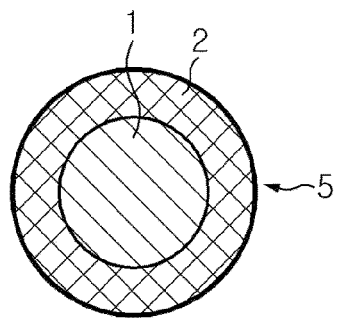
FIG. 1 is a cross-sectional view of a current collector including a polymer core and a metal coating layer formed on the surface of the polymer core according to an exemplary embodiment.

| [Explanation of reference numerals] | |
|---|---|
| 1: | Polymer core |
| 2: | Metal coating layer |
| 5: | Polymer current collector including metal coating layer |
| 10: | Current collector of inner electrode |
| 11: | Active material of inner electrode |
| 20: | Current collector of outer electrode |
| 21: | Active material of outer electrode |
| 30: | Electrolyte layer |
| 31: | First electrolyte layer |
| 32: | Second electrolyte layer |
| 40: | Protective cover |
| 50: | Polymer current collector including metal coating layer |

MODE FOR DISCLOSURE

Hereinafter, preferred embodiments of the present disclosure will be described in detail with reference to the accompanying drawings. The description proposed herein is just a preferable example for the purpose of illustrations only, not intended to limit the scope of the disclosure, so it should be understood that other equivalents and modifications could be made at the time of filing the present application.

FIG. 1 illustrates a cable-type secondary battery of the present disclosure. Referring to FIG. 1, the cable-type secondary battery includes electrodes, each of which includes a current collector having a horizontal cross section of a predetermined shape and an active material layer formed on the surface of the current collector, extending in lengthwise direction and arranged in parallel. Each of the current collectors 5 includes a polymer core 1 and a metal coating layer 2 formed on the surface of the polymer core. The term "predetermined shape" means that the shape is not particularly limited and any shape is possible so long as the essential features of the present disclosure are not impaired. The current collector 5 may have a horizontal cross section of a circular or polygonal structure. The circular structure is intended to include a geometrically perfect symmetrical circle and a geometrically asymmetrical ellipse. The polygonal structure of the current collector is not specifically limited, and non-limiting examples thereof include triangular, quadrangular, pentagonal and hexagonal shapes. The sheet-like current collector 5 may be modified or processed into a pipe-like current collector having a circular or polygonal shape.

The cable-type secondary battery has a horizontal cross section of a predetermined shape and has a linear structure elongated in the lengthwise direction relative to the horizontal cross section. Flexibility is an important factor in freely changing the shape of the cable-type secondary battery. Particularly, taking into consideration the presence of the plural electrodes in the cable-type secondary battery of the present disclosure, even a very small difference in the flexibility of the plural current collectors included in the electrodes has a great influence on the flexibility of the secondary battery.

In view of this, the cable-type secondary battery of the present disclosure is characterized by the use of the current collector 5 including the polymer core 1 and the metal coating layer 2 formed on the surface of the polymer core. Current collectors play a role in collecting electrons generated by the electrochemical reactions of active materials or supplying electrons required for electrochemical reactions. General current collectors are made of metals, such as copper and aluminum. However, the use of metal current collectors is disadvantageous in terms of flexibility, making it difficult to achieve weight reduction of batteries. In consideration of the disadvantages of metal current collectors, some current collectors made of conductive polymers, such as polypyrrole, have been introduced recently. However, low conductivity of conductive polymer current collectors brings about deterioration of battery performance. In contrast, the presence of the polymer core 1 in the current collector 5 ensures flexibility and weight reduction of the battery and the metal coating layer 2 formed on the surfaces of the polymer core 1 imparts conductivity of the metal to the battery to prevent deterioration of battery performance.

The polymer core 1 has a shape elongated in the lengthwise direction relative to the cross section having a predetermined shape. The metal coating layer 2 formed on the surface of the polymer core 1 has high electrical conductivity.

Examples of polymers suitable for the formation of the polymer core 1 include, but are not particularly limited to: non-conductive polymers, such as polyethylene (PE), polypropylene (PP), polyvinyl chloride (PVC), polyvinyl alcohol (PVA), polyacrylate and polytetrafluoroethylene (PTFE); and conductive polymers, such as polyacetylene, polyaniline, polypyrrole, polythiophene and poly(sulfur nitride).

There is no particular limitation on the kind of metals for the formation of the metal coating layer 1. Silver, palladium, nickel and copper are preferably used.

The electrodes include at least one anode as an inner electrode and at least one cathode as an outer electrode. The electrodes are arranged in parallel. The parallel arrangement includes twisted arrangement of the electrodes as well as straight arrangement thereof. The active material layers serve to transfer ions through the current collectors. The ion transfer is determined by the interaction between intercalation of the ions into and deintercalation of the ions from an electrolyte layer.

Generally, a balance of battery capacity is maintained when an anode active material is present in a larger amount than a cathode active material. In the present disclosure, the inner electrode may be provided in plurality. In this case, it is easy to control a balance between the capacity of the inner electrodes and the capacity of the outer electrode.

Non-limiting examples of active materials suitable for use in the anode include carbonaceous materials, LTO, and Si, Sn, Li, Zn, Mg, Cd, Ce, Ni, Fe and oxides thereof. These active materials may be used alone or as a mixture of two or more thereof. The anode active materials may be in the form of particles. The carbonaceous materials are not particularly limited, and examples thereof include natural graphite and artificial graphite. Composites of the carbonaceous materials and metals may also be used. Non-limiting examples of active materials suitable for use in the cathode include: $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$, $x+y+z \leq 1$). These cathode active materials may be used alone or as a mixture of two or more thereof.

In the following description, a brief explanation will be given regarding specific structures of the cable-type secondary battery including the current collectors according to the present disclosure. The same reference numerals represent the same or like elements throughout the drawings.

Figure 2:
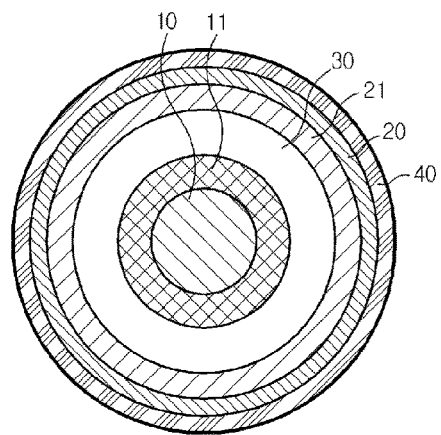
FIG. 2 is a cross-sectional view of a cable-type secondary battery including an inner electrode, an outer electrode and an electrolyte layer filled between the electrodes according to an exemplary embodiment.

FIG. 2 illustrates a cable-type secondary battery according to an exemplary embodiment. Referring to FIG. 2, the cable-type secondary battery includes: an inner electrode as an anode consisting of a current collector 10 and an anode active material 11 applied to the current collector 10, the current collector 10 having a horizontal cross section of a predetermined shape, extending in lengthwise direction and including a polymer core and a metal coating layer formed on the surface of the polymer core; an electrolyte layer 30 as an ionic path filled to surround the inner electrode; an outer electrode as a cathode surrounding the outer surface of the electrolyte layer and consisting of a pipe-like current collector 20 having a horizontal cross section of a predetermined shape and a cathode active material 21 applied to the current collector 20; and a protective cover 40 disposed on the periphery of the outer electrode. The inner electrode may be provided in plurality. In this case, the inner electrodes are arranged in parallel. This configuration increases the contact area between the inner electrodes and the pipe-like outer electrode, leading to a high battery rate. The number of the inner electrodes can be determined to facilitate control of a balance between the capacity of the inner electrodes and the capacity of the outer electrode. In each of the anode and the cathode of the cable-type secondary battery, the active material 11 or 21 is applied to the current collector 10 or 20, which includes the polymer core and the metal coating layer formed on the polymer core. Each of the electrodes is preferably produced by extrusion coating an electrode slurry including the active material on the current collector through an extruder. The cable-type secondary battery is fabricated by the following procedure. First, the electrolyte layer 30 is formed on the outer surface of the inner electrode by coating. Alternatively, the inner electrode may be inserted into the electrolyte layer 30. Then, the outer electrode and the protective cover 40 are sequentially formed on the outer surface of the electrolyte layer 30. Alternatively, the cable-type secondary battery may be fabricated by sequentially forming the outer electrode and the protective cover 40 on the electrolyte layer 30, and inserting the inner electrode into the electrolyte layer 30. Alternatively, the cable-type secondary battery may be fabricated by forming the outer electrode and the protective cover 40, inserting the inner electrode into the outer electrode, and filling the electrolyte layer 30 between the inner electrode and the outer electrode.

The electrolyte layer acting as an ionic path between the electrodes is formed of a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc). A matrix of the solid electrolyte preferably has a polymer or ceramic glass as a basic skeleton. The solid electrolyte is generally satisfactory in ionic conductivity but is disadvantageous in terms of kinetics because ions may migrate very slowly therein. In contrast, ions easily migrate in the gel-type solid electrolyte. Accordingly, the gel-type solid electrolyte is preferably used rather than the solid electrolyte. The gel-type solid electrolyte may include a porous support structure or a crosslinked polymer to compensate for poor mechanical properties thereof. The electrolyte layer 30 can also act as a separator, eliminating the need to use a separator in the cable-type secondary battery of the present disclosure.

The electrolyte layer 30 may further include a lithium salt to achieve improved ionic conductivity and high reaction rate. Non-limiting examples of such lithium salts include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylates and lithium tetraphenylborate.

The protective cover as an insulator is formed on the outer surface of the battery to protect the electrodes against moisture in air and external impact. A general polymeric resin, for example, PVC, HDPE or epoxy resin, may be used as a material for the protective cover.

The cable-type secondary battery of FIG. 2 may be modified. Some modified examples of the cable-type secondary battery are illustrated in FIGS. 3, 4 and 5.

Figure 3:
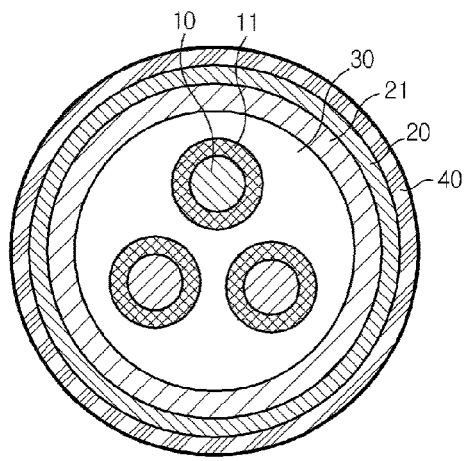
FIG. 3 is a cross-sectional view of a cable-type secondary battery including inner electrodes, an outer electrode and an electrolyte layer filled between the electrodes according to an exemplary embodiment.

FIG. 3 illustrates a cable-type secondary battery according to an exemplary embodiment. Referring to FIG. 3, the cable-type secondary battery includes: two or more inner electrodes as anodes arranged in parallel, each of which consists of a current collector 10 and an anode active material 11 applied to the current collector 10, the current collector 10 having a horizontal cross section of a predetermined shape, extending in lengthwise direction and including a polymer core and a metal coating layer formed on the surface of the polymer core; an electrolyte layer 30 as an ionic path, filled to surround the inner electrodes; an outer electrode as a cathode surrounding the outer surface of the electrolyte layer and consisting of a pipe-like current collector 20 having a horizontal cross section of a predetermined shape and a cathode active material 21 applied to the current collector 20; and a protective cover 40 disposed on the periphery of the outer electrode. This configuration increases the contact area between the inner electrodes and the pipe-like outer electrode, leading to a high battery rate. The number of the inner electrodes can be determined to facilitate control of a balance between the capacity of the inner electrodes and the capacity of the outer electrode. In each of the anodes and the cathode of the cable-type secondary battery, the active material 11 or 21 is applied to the current collector 10 or 20, which includes the polymer core and the metal coating layer formed on the polymer core. A general coating process, such as electroplating or anodic oxidation, may be employed to apply the active material 11 or 21 to the current collector 10 or 20. Each of the electrodes is preferably produced by extrusion coating an electrode slurry including the active material on the current collector through an extruder. The cable-type secondary battery is fabricated by the following procedure. First, the electrolyte layer 30 is formed on the outer surfaces of the inner electrodes by coating. Alternatively, the inner electrodes may be inserted into the electrolyte layer 30. Then, the outer electrode and the protective cover 40 are sequentially formed on the outer surface of the electrolyte layer 30. Alternatively, the cable-type secondary battery may be fabricated by sequentially forming the outer electrode and the protective cover 40 on the electrolyte layer 30, and inserting the inner electrodes into the electrolyte layer 30. Alternatively, the cable-type secondary battery may be fabricated by forming the outer electrode and the protective cover 40, inserting the inner electrodes into the outer electrode, and filling the electrolyte layer 30 between the inner electrodes and the outer electrode.

Figure 4:
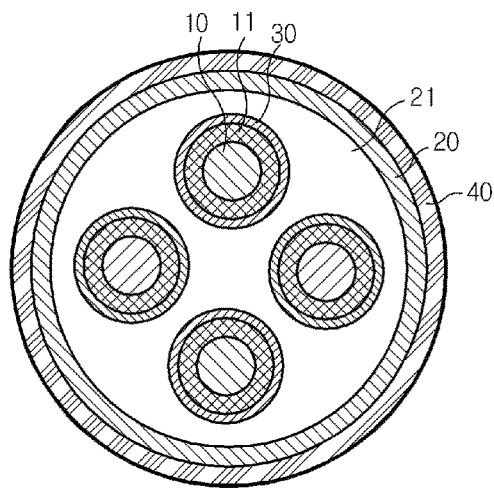
FIG. 4 is a cross-sectional view of a cable-type secondary battery in which an active material layer is filled to surround inner electrodes according to an exemplary embodiment.

FIG. 4 illustrates a cable-type secondary battery according to an exemplary embodiment. Referring to FIG. 4, the cable-type secondary battery includes: inner electrodes as anodes arranged in parallel, each of which consists of a current collector 10 and an anode active material 11 applied to the current collector 10, the current collector 10 having a horizontal cross section of a predetermined shape, extending in lengthwise direction and including a polymer core and a metal coating layer formed on the surface of the polymer core; electrolyte layers 30 as ionic paths, each of which is formed on the outer surface of the anode active material 11; an outer electrode as a cathode consisting of a cathode active material layer 21 filled to surround the inner electrodes and a current collector 20 including a polymer core and a metal coating layer formed on the surface of the polymer core; and a protective cover 40 disposed on the periphery of the outer electrode. This configuration increases the contact area between the pipe-like outer electrode and the inner electrodes, leading to a high battery rate. The number of the inner electrodes can be determined to facilitate control of a balance between the capacity of the inner electrodes and the capacity of the outer electrode. The formation of the electrolyte layers on the inner electrodes can prevent shorting between the electrodes. The cable-type secondary battery is fabricated by the following procedure. First, each of the electrolyte layers 30 is formed on the outer surface of the inner electrode. Then, the active material 21 is coated on the outer surfaces of the electrolyte layers 30. Alternatively, the inner electrodes may be inserted into the active material layer 21. Thereafter, the current collector 20 of the outer electrode and the protective cover 40 are sequentially formed on the outer surface of the active material layer 21. Alternatively, the cable-type secondary battery may be fabricated by forming the outer electrode, in which the active material is filled, and the protective cover 40, and inserting the inner electrodes into the active material. Alternatively, the cable-type secondary battery may be fabricated by forming the current collector 21 of outer electrode and the protective cover 40, inserting the inner electrodes into the current collector 21, and filing the active material 21 between the electrolyte layers 30 and the inner electrodes.

Figure 5:
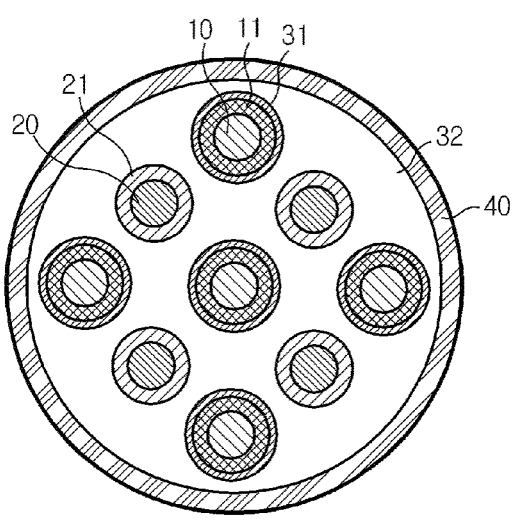
FIG. 5 is a cross-sectional view of a cable-type secondary battery including first electrolyte layers and a second electrolyte layer according to an exemplary embodiment.
Figure 6:
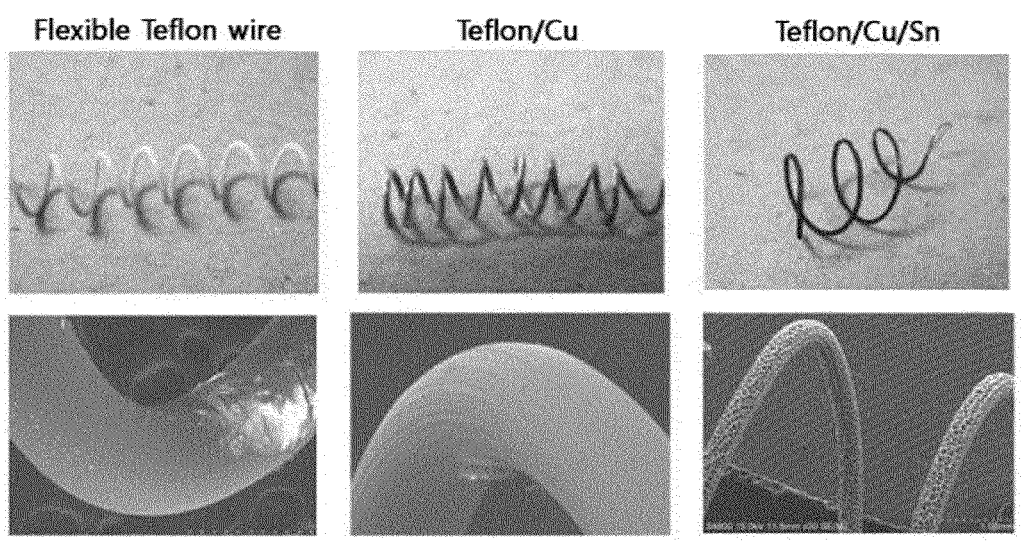
FIG. 6 shows SEM images of a current collector including a polymer core and a metal coating layer formed on the surface of the polymer core according to an exemplary embodiment.

FIG. 5 illustrates a cable-type secondary battery according to an exemplary embodiment. Referring to FIG. 5, the cable-type secondary battery includes: one or more anodes, each of which consists of a current collector 10 and an anode active material 11 applied to the current collector 10, the current collector 10 having a horizontal cross section of a predetermined shape, extending in lengthwise direction and including a polymer core and a metal coating layer formed on the surface of the polymer core, a first electrolyte layer 31 as an ionic path being formed on the outer surface of the anode active material layer 11; one or more cathodes, each of which consists of a current collector 20 and a cathode active material 21 applied to the current collector 20, the current collector 20 having a horizontal cross section of a predetermined shape, extending in lengthwise direction and including a polymer core and a metal coating layer formed on the surface of the polymer core; a second electrolyte layer 32 as an ionic path allowing the anodes and the cathodes to be arranged in parallel and filled to surround the anodes and the cathodes; and a protective cover 40 disposed on the periphery of the second electrolyte layer 32. An electrolyte layer may be formed on each of the cathodes to prevent shorting between the electrodes. This configuration increases the contact area between the cathodes and the anodes, leading to a high battery rate. The number of the anodes and the cathodes can be determined to facilitate control of a balance between the capacity of the electrodes. The cable-type secondary battery is fabricated by the following procedure. First, the first electrolyte layers 31 are coated on the anode active material and the second electrolyte layer 32 is coated so as to surround the anodes and the cathodes. Alternatively, the anodes and the cathodes may be inserted into the second electrolyte layer 32. Then, the protective cover 40 is formed on the outer surface of the second electrolyte layer 32. Alternatively, the cable-type secondary battery may be fabricated by forming the second electrolyte layer 32 and the protective cover 40, and inserting the anodes and the cathodes into the second electrolyte layer 32.

Hereinafter, preferred embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Production Example 1

Metal-Coated Polymer Current Collector

Teflon was extruded to produce a polymer core in the form of a wire. Copper was coated on the surface of the polymer core by electroless plating to produce a current collector. Tin (Sn) was electroplated on the current collector in the form of a wire to form an anode active material layer, completing the production of an anode.

Example 1

Cable-Type Secondary Battery Using the Metal-Coated Polymer Current Collector

A beaker cell in the form of a 3-electrode electrochemical cell was fabricated using lithium foils as counter and reference electrodes, the anode produced in Production Example 1 as a working electrode and a solution of 1 M $LiPF_6$ in EC/DEC (50/50, v/v)) as an electrolyte solution.

Test Example 1

Measurement of Conductivities of Current Collectors

The copper-coated Teflon current collector produced in Production Example 1, a copper current collector and a current collector made of polypyrrole as a conductive polymer were measured for electrical conductivity. The results are shown in Table 1.

TABLE 1

| Collector | Conductivity (S/cm) |
| --- | --- |
| Copper-coated polymer current collector | $3.7 \times 10^5$ |
| Copper current collector | $3.9 \times 10^5$ |
| Conductive polymer current collector | $10^2$ |

As can be seen from the results in Table 1, the electrical conductivity of the copper-coated polymer current collector produced in Production Example 1 is similar to that of the copper current collector and is considerably high compared to that of the polypyrrole current collector.

Test Example 2

Measurement of Flexibility

The bending ability of the copper-coated polymer current collector produced in Production Example 1 was measured at different curvatures to determine the flexibility of the current collector. The bending ability is indicative of the deformation and flexibility of the metal coating of the metal-coated polymer current collector under applied external force.

Figure 7:
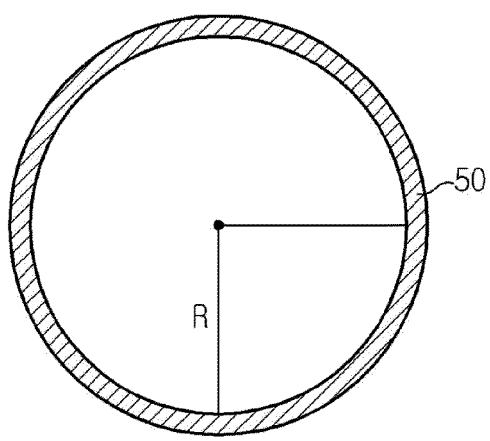
FIG. 7 is a view for explaining a method for measuring the bending ability of a current collector according to an exemplary embodiment.

As illustrated in FIG. 7, the current collector in the form of a wire was wound on a circular plate. The surface of the metal coating was observed by SEM by varying the radii of curvature R (curvature 1/R) of the current collector to 1.5 mm, 2.5 mm, 3.25 mm, 3.5 mm, 5 mm and 15 mm. The images are shown in FIG. 8.

Figure 8:
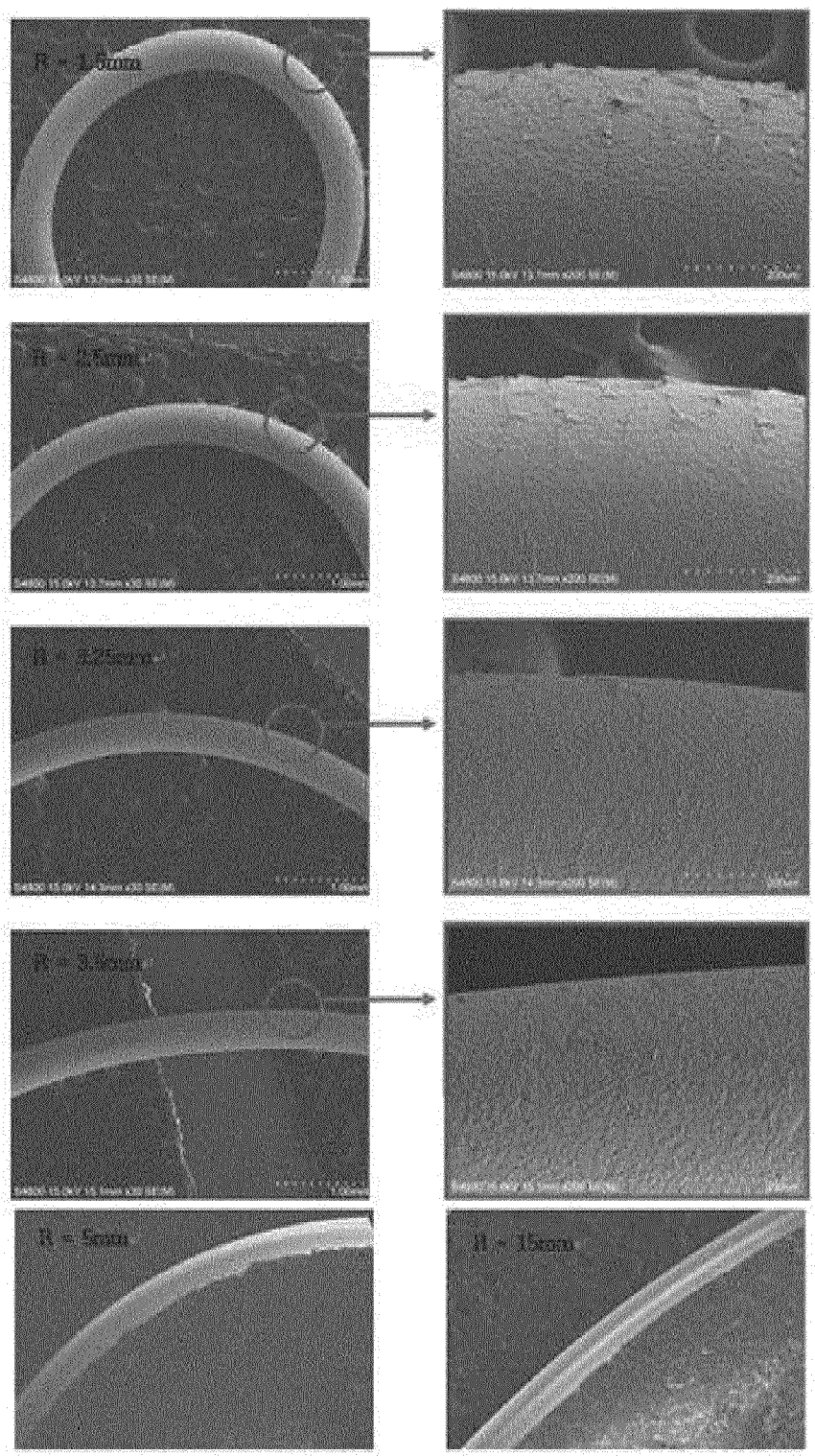
FIG. 8 shows SEM images of the surface of a current collector including a polymer core and a metal coating layer formed on the surface of the polymer core when the bending ability of the current collector was measured at different radii of curvature.

The images of FIG. 8 show that cracks are observed on the surface of the metal coating at radii of curvature not larger than 3.5 mm, and no cracks are observed at radii of curvature of 5 mm and 15 mm, implying that the surface state of the metal coating is good.

Test Example 3

Measurement of Battery Performance

Figure 9:
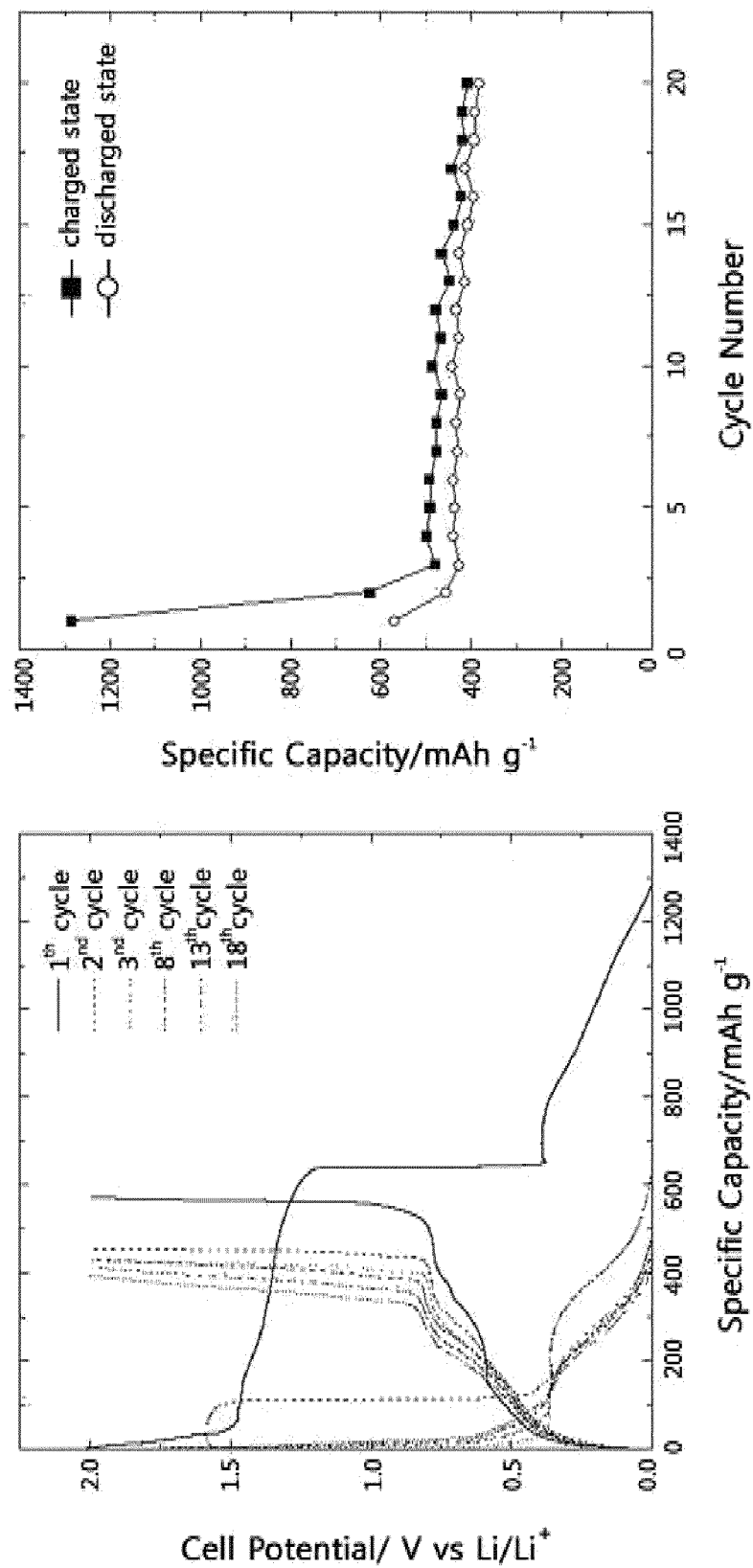
FIG. 9 shows charge-discharge curves of a cell according to an exemplary embodiment.

The cell fabricated in Example 1 was charged to 5 mV with a current density of 0.5 C under constant current conditions and maintained at a constant voltage of 5 mV. Charging was stopped when the current density reached 0.005 C. The cell was discharged to 2 V with a current density of 0.5 C in a CC mode. Charge and discharge cycles were repeated twenty times under the same conditions as above. The charge-discharge test results are shown in FIG. 9.

What is claimed is:

1. A cable-type secondary battery comprising:
   electrodes, each electrode comprising a current collector having a horizontal cross section of a predetermined shape;
   an active material layer formed on the surface of the current collector; and
   an electrolyte material;
   wherein the electrodes are embedded into the electrolyte material and extend in parallel in a lengthwise direction of the cable-type battery,
   wherein the current collector comprises a non-conductive polymer and a metal coating layer formed on the surface of the non-conductive polymer.

2. The cable-type secondary battery according to claim 1, wherein the non-conductive polymer is formed of at least one polymer selected from polyethylene (PE), polypropylene (PP), polyvinyl chloride (PVC), polyvinyl alcohol (PVA), polyacrylate and polytetrafluoroethylene (PTFE).

3. The cable-type secondary battery according to claim 1, wherein the metal coating layer is formed of at least one metal selected from silver, palladium, nickel and copper.

4. The cable-type secondary battery according to claim 1, wherein the active material is in the form of particles of at least one anode active material selected from the group consisting of carbonaceous materials, LTO, and Si, Sn, Li, Zn, Mg, Cd, Ce, Ni, Fe and oxides thereof.

5. The cable-type secondary battery according to claim 1, wherein the active material is in the form of particles of at least one cathode active material selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y \leq 0.5$, $0 \leq z \leq 0.5$, $x+y+z \leq 1$).

6. A cable-type secondary battery comprising:
   a plurality of inner electrodes as anodes, each inner electrode comprising a current collector and an anode active material layer formed on the current collector, the current collector having a horizontal cross section of a predetermined shape, extending in lengthwise direction and including a non-conductive polymer and a metal coating layer formed on the surface of the non-conductive polymer;
   an electrolyte layer as an ionic path, the inner electrodes embedded in the electrolyte layer;
   an outer electrode as a cathode surrounding the outer surface of the electrolyte layer and comprising a pipe-like current collector having a horizontal cross section of a predetermined shape and a cathode active material layer formed on the current collector; and
   a protective cover disposed on the periphery of the outer electrode.

7. A cable-type secondary battery comprising:
   two or more inner electrodes as anodes, each inner electrode comprising a current collector and an anode active material layer formed on the current collector, the current collector having a horizontal cross section of a predetermined shape, extending in lengthwise direction and including a non-conductive polymer and a metal coating layer formed on the surface of the non-conductive polymer;
   an electrolyte layer as an ionic path, the inner electrodes embedded in the electrolyte layer;
   an outer electrode as a cathode surrounding the outer surface of the electrolyte layer and comprising a pipe-like current collector and a cathode active material layer formed on the current collector; and
   a protective cover disposed on the periphery of the outer electrode.

8. A cable-type secondary battery comprising:
   two or more inner electrodes as anodes arranged in parallel, each inner electrode comprising a current collector and an anode active material layer formed on the current collector and having an electrolyte layer thereon serving as an ion channel, the current collector having a horizontal cross section of a predetermined shape, extending in lengthwise direction and comprising a non-conductive polymer and a metal coating layer formed on the surface of the non-conductive polymer;

an outer electrode as a cathode comprising a pipe-like current collector and a cathode active material layer, the inner electrodes embedded in the cathode active material layer; and a protective cover disposed on the periphery of the outer electrode.

9. A cable-type secondary battery comprising:

two or more inner electrodes as cathodes arranged in parallel, each inner electrode comprising a current collector and a cathode active material layer formed on the current collector and having an electrolyte layer thereon serving as an ion channel, the current collector having a horizontal cross section of a predetermined shape, extending in lengthwise direction and comprising a non-conductive polymer and a metal coating layer formed on the surface of the non-conductive polymer;

an outer electrode as an anode comprising a pipe-like current collector and an anode active material layer, the inner electrodes embedded in the anode active material layer; and a protective cover disposed on the periphery of the outer electrode.

10. A cable-type secondary battery comprising:

one or more anodes, each anode comprising an anode a current collector and an anode active material layer formed on the anode current collector, the anode current collector having a horizontal cross section of a predetermined shape, extending in lengthwise direction and comprising a non-conductive polymer and a metal coating layer formed on the surface of the non-conductive polymer, a first electrolyte layer as an ionic path being formed on the outer surface of the anode active material layer;

one or more cathodes, each cathode comprising a cathode current collector and a cathode active material layer formed on the cathode current collector, the cathode current collector having a horizontal cross section of a predetermined shape, extending in lengthwise direction and comprising a non-conductive polymer and a metal coating layer formed on the surface of the non-conductive polymer;

a second electrolyte layer as an ionic path allowing the anodes and the cathodes to be arranged in parallel, the anodes and the cathodes embedded in the second electrolyte layer; and a protective cover disposed on the periphery of the second electrolyte layer.

11. A cable-type secondary battery comprising:

one or more cathodes, each cathode comprising a cathode current collector and a cathode active material layer formed on the cathode current collector, the cathode current collector having a horizontal cross section of a predetermined shape, extending in lengthwise direction and comprising a non-conductive polymer and a metal coating layer formed on the surface of the non-conductive polymer, a first electrolyte layer as an ionic path being formed on the outer surface of the cathode active material layer;

one or more anodes, each anode comprising an anode current collector and an anode active material layer formed on the anode current collector, the anode current collector having a horizontal cross section of a predetermined shape, extending in lengthwise direction and comprising a non-conductive polymer and a metal coating layer formed on the surface of the non-conductive polymer;

a second electrolyte layer as an ionic path allowing the anodes and the cathodes to be arranged in parallel, the anodes and the cathodes embedded in the second electrolyte layer; and a protective cover disposed on the periphery of the second electrolyte layer.

12. The cable-type secondary battery according to claim 6, wherein the electrolyte layer is formed of a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc).

13. The cable-type secondary battery according to claim 6, wherein the electrolyte layer further comprises a lithium salt.

14. The cable-type secondary battery according to claim 13, wherein the lithium salt is selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylates, lithium tetraphenylborate, and mixtures of two or more thereof.

15. The cable-type secondary battery according to claim 7, wherein the electrolyte layer is formed of a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc).

16. The cable-type secondary battery according to claim 8, wherein the electrolyte layer is formed of a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc).

17. The cable-type secondary battery according to claim 9, wherein the electrolyte layer is formed of a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc).

18. The cable-type secondary battery according to claim 10, wherein the first electrolyte layer and the second electrolyte layer are each independently formed of a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc).

19. The cable-type secondary battery according to claim 11, wherein the first electrolyte layer and the second electrolyte layer are each independently formed of a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc).

* * * * *